(12) United States Patent
Sumiyoshi et al.

(10) Patent No.: US 12,031,653 B2
(45) Date of Patent: Jul. 9, 2024

(54) HOSE JOINT

(71) Applicant: TOYOX CO., LTD., Toyama (JP)

(72) Inventors: Yoichi Sumiyoshi, Toyama (JP); Tomoaki Tanaka, Toyama (JP)

(73) Assignee: TOYOX CO., LTD., Toyama (JP)

( * ) Notice: Subject to any disclaimer, the term of this patent is extended or adjusted under 35 U.S.C. 154(b) by 0 days.

(21) Appl. No.: 17/425,097

(22) PCT Filed: Feb. 7, 2020

(86) PCT No.: PCT/JP2020/004879
§ 371 (c)(1),
(2) Date: Jul. 22, 2021

(87) PCT Pub. No.: WO2020/166516
PCT Pub. Date: Aug. 20, 2020

(65) Prior Publication Data
US 2022/0107042 A1 Apr. 7, 2022

(30) Foreign Application Priority Data
Feb. 12, 2019 (JP) .................................. 2019-022779

(51) Int. Cl.
*F16L 33/23* (2006.01)
(52) U.S. Cl.
CPC ..................... *F16L 33/23* (2013.01)
(58) Field of Classification Search
CPC ...... F16L 33/23; F16L 33/2078; F16L 33/222
(Continued)

(56) References Cited

U.S. PATENT DOCUMENTS 3,222,091 A * 12/1965 Marshall ............... F16L 33/225
285/259
4,653,779 A 3/1987 Foster
(Continued)

FOREIGN PATENT DOCUMENTS

AT 8016 U1 12/2005
CN 102597593 7/2012
(Continued)

OTHER PUBLICATIONS

International Search Report issued in International Patent Application No. PCT/JP2020/004879, dated Apr. 14, 2020, along with an English translation thereof.
(Continued)

*Primary Examiner* — James M Hewitt, II
(74) *Attorney, Agent, or Firm* — GREENBLUM & BERNSTEIN, P.L.C.

(57) ABSTRACT

A hose joint includes a cylindrical nipple provided along an insertion space of the flexible hose, an elastic sleeve which is provided so as to clamp the insertion space of the flexible hose between an outer peripheral face of the nipple and the elastic sleeve in a radial direction and is deformable in the radial direction, and a tightening member provided outside the elastic sleeve and having a pressing part that presses the elastic sleeve toward the nipple, wherein the nipple has a large-diameter cylindrical face which is smooth in the axial direction and faces and pressure-welds to an inner surface of the flexible hose in the radial direction on an axial direction front end of an outer peripheral face, and the elastic sleeve has a cylindrical inner face which is smooth in the axial direction and pressure-welds to an outer surface of the flexible hose.

5 Claims, 3 Drawing Sheets

(58) Field of Classification Search
USPC .......................................................... 285/243
See application file for complete search history.

(56) References Cited

U.S. PATENT DOCUMENTS

| | | |
|---|---|---|
| 5,267,758 A | 12/1993 | Shah et al. |
| 2010/0102551 A1 | 4/2010 | Zeiber |
| 2015/0035276 A1 | 2/2015 | Shmelev et al. |

FOREIGN PATENT DOCUMENTS

| | | | |
|---|---|---|---|
| CN | 102906481 | 1/2013 | |
| CN | 103917816 | 7/2014 | |
| CN | 106170655 | 11/2016 | |
| DE | 3627274 A1 * | 8/1986 | |
| DE | 102010038170 | 8/2011 | |
| DE | 202012101020 U1 | 7/2012 | |
| GB | 2022744 | 12/1979 | |
| JP | 59-62388 U | 4/1984 | |
| JP | 2001-193876 | 7/2001 | |
| JP | 2009-270622 | 11/2009 | |
| JP | 2011-102605 | 5/2011 | |
| JP | 2015-517067 | 6/2015 | |
| WO | WO-2011058877 A1 * | 5/2011 | .............. F16L 33/04 |

OTHER PUBLICATIONS

Written Opinion issued in International Patent Application No. PCT/JP2020/004879, dated Apr. 14, 2020, along with an English translation thereof.
International Preliminary Report on Patentability issued in International Patent Application No. PCT/JP2020/004879, dated Jul. 30, 2020, along with an English translation thereof.
China Office Action issued in China Patent Application No. 202080011796.4, dated Jul. 18, 2022, together with English translation thereof.
Extended European Search Report issued in European Patent Application No. 20754138.4, dated Sep. 23, 2022.
China Office Action issued in China Patent Application No. 202080011796.4, dated Jul. 12, 2023, together with an English translation thereof.
China Office Action issued in China Patent Application No. 202080011796.4, dated Dec. 26, 2023, together with an English translation thereof.
China Office Action issued in China Patent Application No. 202080011796.4, dated Mar. 14, 2023, together with an English translation thereof.
Indonesia Office Action issued in Indonesia Patent Application No. P00202106685, dated Sep. 29, 2022, together with an English translation thereof.

* cited by examiner

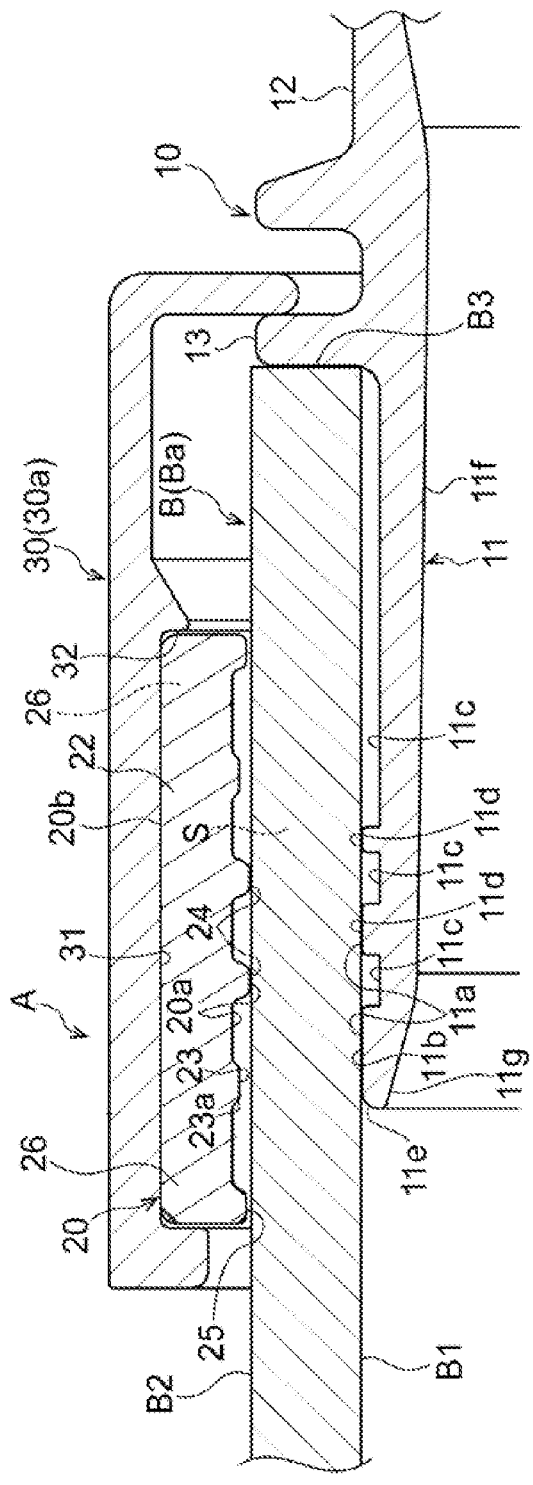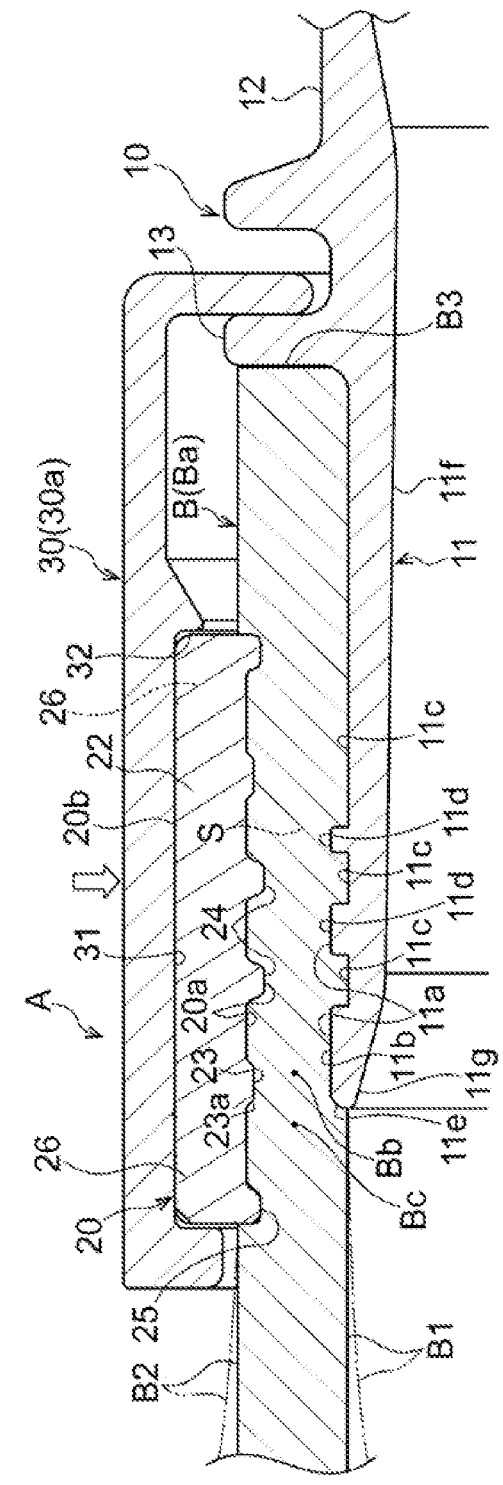
FIG. 1(a)
FIG. 1(b)

HOSE JOINT

TECHNICAL FIELD

The present invention relates to a hose joint used for hose connection of a flexible hose and the like, formed of a flexible soft material, such as silicone rubber, for example.

BACKGROUND ART

Conventionally, as this type of hose joint, there is known a hose connector including a cylindrical nipple on which a protrusion of a size slightly larger than an inner diameter of a hose is formed, a sleeve which is provided facing an outer face of the hose in a radial direction and is deformable in the radial direction, and a cap nut which is provided outside the sleeve and reduces the sleeve (see PTL 1, for example).

On an outer periphery of the nipple, a plurality of protrusions are formed having a barbed shape in an axial direction to perform an action of anti-slipping of the hose.

On an inner face of the sleeve, a large number of peripheral protrusions are continuously formed in the axial direction so as to facilitate biting into (close contact with) an outer face of the hose.

On the inner face of the cap nut, a pressing part which reduces the sleeve in conjunction with movement in the axial direction with respect to the nipple is provided, the peripheral protrusions are brought into close contact with the outer face of the hose by contract-deformation of the sleeve, and the inner face of the hose is brought into close contact with the outer periphery of the nipple.

CITATION LIST

Patent Literature

[PTL 1] Japanese Patent Application Publication No. 2001-193876

SUMMARY OF INVENTION

Technical Problem

As constituent materials of the flexible hose and the like, silicone rubber having excellent properties such as heat resistance/cold resistance, low leachability, high insulation, tasteless/odorless and the like attracts attention and is highly demanded particularly in the food/drink industries, semiconductor industry, chemical industry, and the like.

The flexible hose made of silicone rubber is softer and poorer in tearing strength and tensile strength than those of a generally used synthetic resin hose, and since a slight cut thereof can easily lead to fracture, care has to be taken when tightening the flexible hose in the hose joint.

However, in PTL 1, the hose is clamped in the radial direction between the barbed-shaped protrusions on the outer periphery of the nipple and the peripheral protrusions on the inner face of the sleeve and tightened. Therefore, in a case where the hose is a flexible hose made of a soft material such as silicone, when the hose is bent in a state where strong tightening is implemented between the barbed-shaped protrusions on the nipple and the peripheral protrusions on the sleeve, there is a concern that the barbed-shaped protrusions on the nipple and the peripheral protrusions on the sleeve bite into and damage the inner face and the outer face of the hose.

Particularly in a case where the hose is a flexible hose made of a material that is poor in the tearing strength, such as silicone rubber, a problem may arise in which even a slight cut in a part of the inner face or the outer face thereof can spread at once and lead to fracture, which develops to a serious fluid leakage accident.

Solution to Problem

In order to solve such problem, the hose joint according to the present invention includes a cylindrical nipple provided along an insertion space of the flexible hose, an elastic sleeve which is provided so as to clamp the insertion space of the flexible hose between an outer peripheral face of the nipple and the elastic sleeve in a radial direction and is deformable in the radial direction, and a tightening member provided outside of the elastic sleeve and having a pressing part which presses the elastic sleeve toward the nipple, wherein the nipple has a large-diameter cylindrical face which is smooth in the axial direction and faces and pressure-welds to an inner surface of the flexible hose in the radial direction on an axial direction front end of the outer peripheral face, and the elastic sleeve has a cylindrical inner face which is smooth in the axial direction and pressure-welds to an outer surface of the flexible hose on a sleeve inner face facing the large-diameter cylindrical face of the nipple in the radial direction across the flexible hose clamped.

BRIEF DESCRIPTION OF DRAWINGS

FIGS. 1(a) and 1(b) are explanatory views illustrating entire configuration of a hose joint according to an embodiment of the present invention, in which FIG. 1(a) is a vertical cross-sectional front view of a state before tightening, and FIG. 1(b) is a vertical cross-sectional front view of a tightened state.

FIGS. 2(a) and 2(b) are is a perspective views of an elastic sleeve, in which FIG. 2(a) illustrates entirety of an elastic sleeve, and FIG. 2(b) illustrates an exploded state of the elastic sleeve.

FIGS. 3(a)-3(d) are reduced perspective views illustrating a connecting method between the hose joint and a hose body, in which FIG. 3(a) is an exploded perspective view before connection, FIG. 3(b) is an appearance perspective view of an assembling start state, FIG. 3(c) is an appearance perspective view before tightening, and FIG. 3(d) is an appearance perspective view after the tightening.

DESCRIPTION OF EMBODIMENT

Hereinafter, an embodiment of the present invention will be described in detail on the basis of the drawings.

Figure 2:
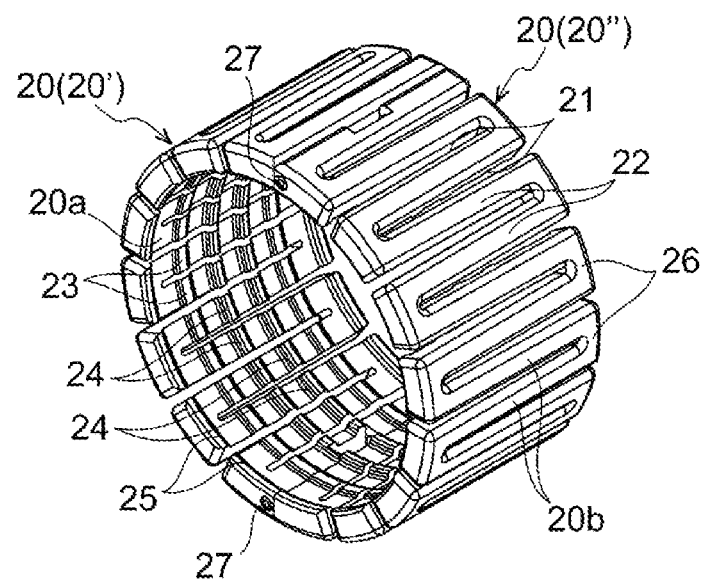
Figure 2:
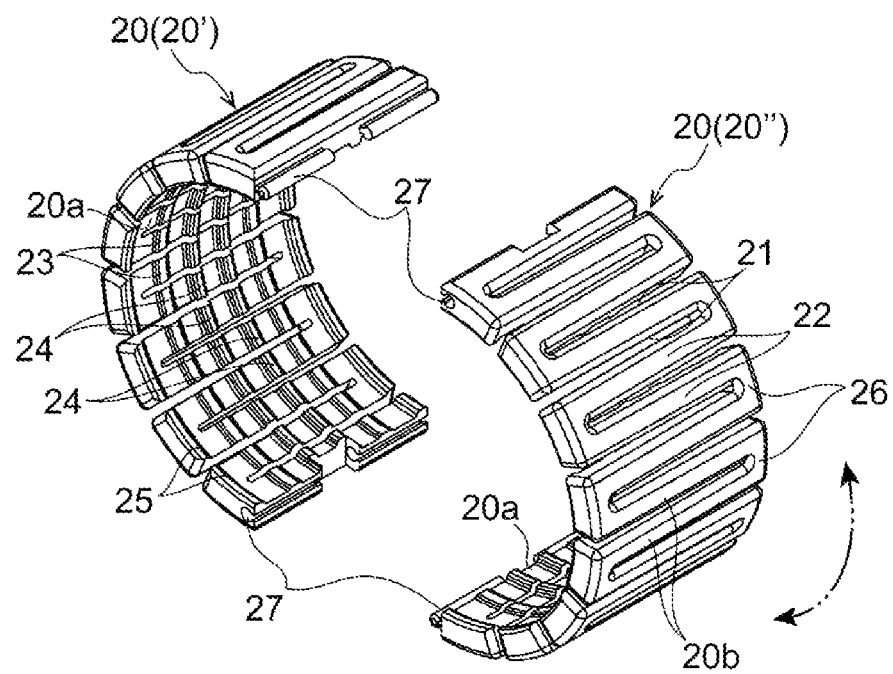
Figure 3:
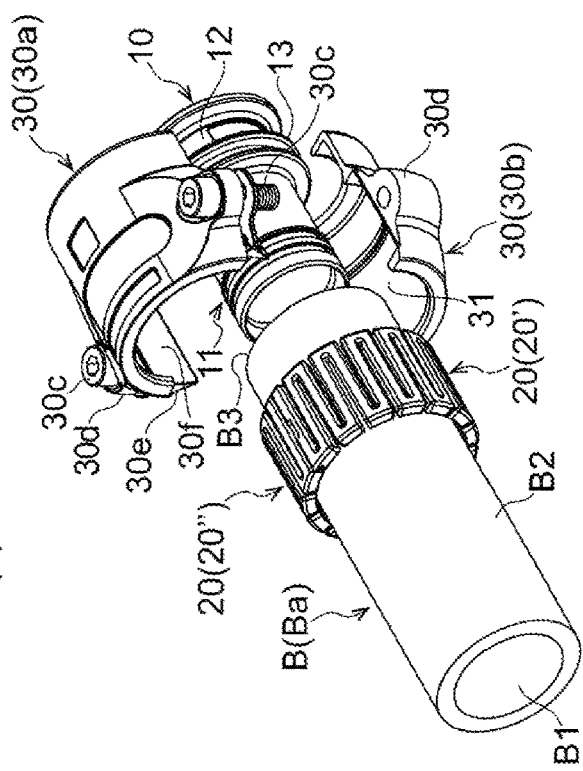
Figure 3:
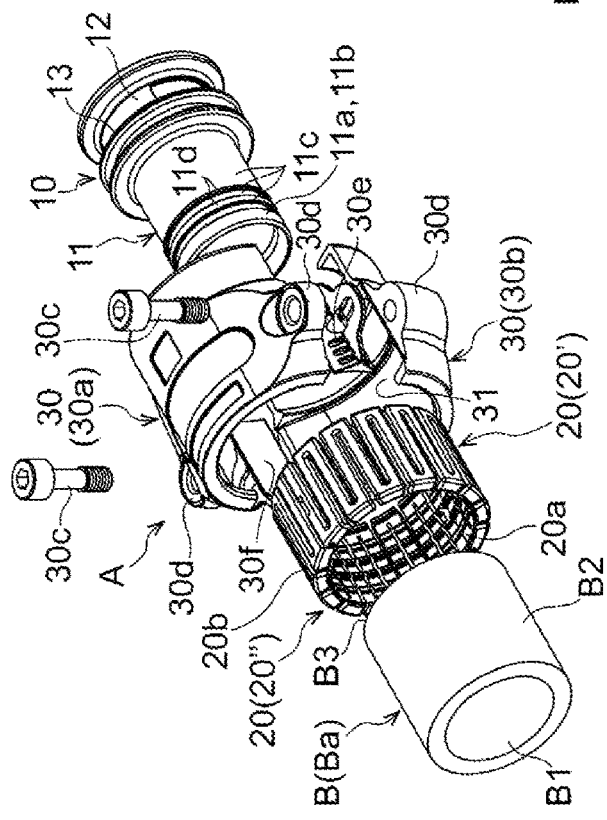
Figure 3:
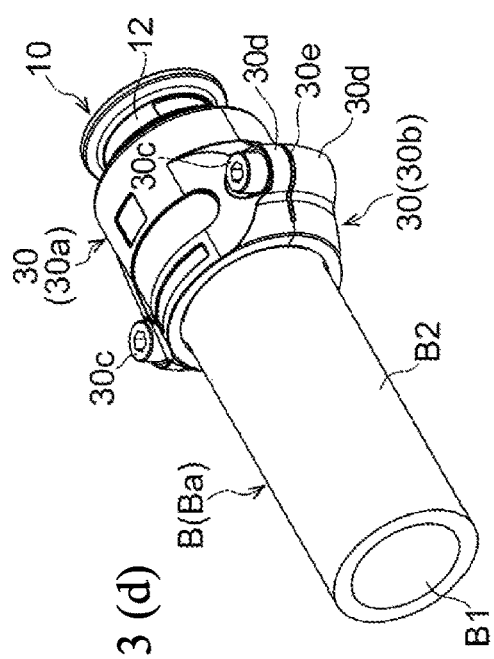
Figure 3:
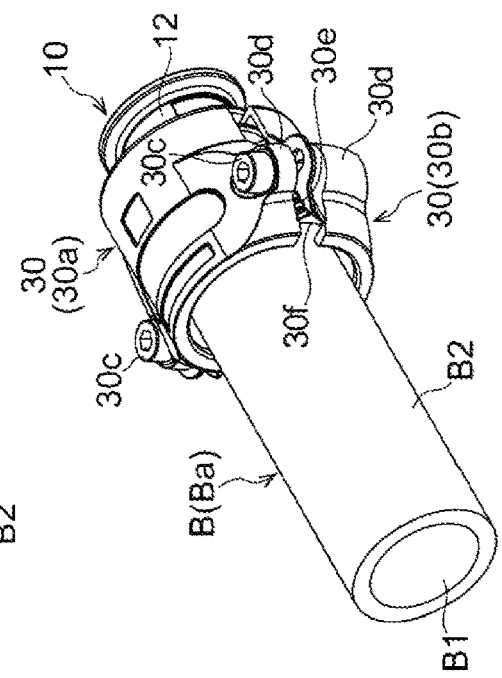

A hose joint A according to the embodiment of the present invention is, as illustrated in FIGS. 1 to 3, a connector in which, after a flexible hose B is inserted into a nipple 11 of a joint main body 10, an elastic sleeve 20 is caused to cover outside of the flexible hose B, and the elastic sleeve 20 and the flexible hose B are directed and pressed to the nipple 11 by a tightening member 30.

In the hose joint A, the flexible hose B made of a flexible soft material such as silicone rubber is clamped in a radial direction between the cylindrical nipple 11 and the elastic sleeve 20 which is deformable in the radial direction, and the flexible hose B is pressed toward an outer peripheral face 11a of the nipple 11 and tightened by radial contracting deformation of the elastic sleeve 20. As a result, the flexible hose B is clamped between the nipple 11 and the elastic sleeve 20 and connected, unable to be pulled off.

In more detail, the hose joint A according to the embodiment of the present invention includes, as major constituent elements, the nipple 11 provided along the insertion space S of the flexible hose B, the elastic sleeve 20 provided so as to surround an outer periphery of the insertion space S of the flexible hose B, and the tightening member 30 provided outside of the elastic sleeve 20 and pressing the elastic sleeve 20 toward the nipple 11.

The flexible hose B is a hose body molded so as to be elastically deformable of a flexible soft material such as silicone rubber or other rubbers or a soft synthetic resin such as vinyl chloride, for example, and having flexibility such as a hose and a tube, for example. Particularly, the flexible hose B is preferably the hose body such as a hose and a tube made of a soft material containing silicone rubber which is softer and poorer in tearing strength and tensile strength than general soft synthetic resins such as vinyl chloride. Moreover, it is preferable that a hose body in which all of an inner surface B1 and an outer surface B2 are flat or a hose body in which the inner surface B1 and the outer surface B2 are flat at least in a connecting end part Ba with a predetermined length from a cut face B3 is used as the flexible hose B.

Into the insertion space S, as illustrated in FIGS. 1(a) and 1(b), the connecting end part Ba of the flexible hose B is inserted.

The hose main body of the flexible hose B is formed into a single-layer structure, or a plurality of layers structure or a multiple-layer structure having a plurality of layers.

As a specific example of the flexible hose B, the hose with the single-layer structure is used in an illustrated example.

Moreover, though not illustrated as other examples, the hose body with the multiple-layer structure can be used as the flexible hose B, instead of the hose body with the single-layer structure. Specific examples of many types of the flexible hoses B include a laminated hose (blade hose) in which a plurality of or a single synthetic resin blade (reinforcing thread) is spirally embedded as an intermediate layer between a transparent or non-transparent outer layer and an inner layer, a spiral reinforced hose (Vohra hose) in which a band-shaped reinforcing material made of a synthetic resin or metal and having a rectangular section and a linear reinforcing material with a circular section or the like are wound spirally as an intermediate layer and integrated, a spiral reinforced hose in which a wire rod made of metal or a hard synthetic resin is spirally embedded and the like.

A joint main body 10 is, as illustrated in FIGS. 1(a) and 1(b), formed of a rigid material such as metal including stainless and brass which are hard to rust and a hard synthetic resin, for example, or by press working and other molding into a thick and substantially cylindrical shape. The joint main body 10 has the cylindrical nipple 11 and a connecting part 12 for connecting to other hose bodies (not shown) or a hose connection port (not shown) of another device.

The nipple 11 is formed so as to face the inner surface B1 of the flexible hose B (connecting end part Ba) in the radial direction on a front end side of the joint main body 10, and the connecting part 12 is formed on the base end side of the joint main body 10.

The nipple 11 is formed cylindrically having an outer diameter substantially the same as an inner diameter of the flexible hose B (connecting end part Ba) or slightly smaller than the inner diameter of the flexible hose B (connecting end part Ba) and has an outer peripheral face 11a facing the inner surface B1 of the flexible hose B inserted into the insertion space S in the radial direction.

The outer peripheral face 11a of the nipple 11 has a large-diameter cylindrical face 11b facing and pressure-welding to the inner surface B1 of the flexible hose B in the radial direction on an axial direction front end.

The large-diameter cylindrical face 11b is formed in a non-inclined smooth shape having the same outer diameter over a region with a predetermined length in the axial direction on the outer peripheral face 11a of the nipple 11.

Moreover, the outer peripheral face 11a of the nipple 11 preferably has an annular groove 11c provided adjacent to the large-diameter cylindrical face 11b in the axial direction.

The annular groove 11c is formed in plural at predetermined intervals toward a depth side (base end side of the joint main body 10) in the outer peripheral face 11a of the nipple 11.

A plurality of smooth large-diameter faces 11d each having substantially the same outer diameter as that of the large-diameter cylindrical face 11b are formed among the plurality of annular grooves 11c. The large-diameter cylindrical face 11b, the plurality of annular grooves 11c, and the plurality of large-diameter faces 11d are recession/projection formed by facing the inner surface B1 of the flexible hose B in the radical direction and have a coming-off prevention function of the flexible hose B.

A corner part 11e of the large-diameter cylindrical face 11b which is a front end edge of the nipple 11 is preferably chamfered. The chamfering includes R-chamfering in which the corner part 11e is worked into a shape with an arc section and C-chamfering in which the corner part 11e is diagonally chipped off.

Moreover, on an inner peripheral face 11f of the nipple 11, it is preferable to form a tapered part 11g which is radially expanding-deformed toward the front end thereof.

In the case illustrated in FIGS. 1 to 3 as a specific example of the joint main body 10, the large-diameter cylindrical face 11b, the plurality of annular grooves 11c, and the plurality of large-diameter faces 11d are alternately disposed in the axial direction on the front end part in the outer peripheral face 11a of the nipple 11. In the case of the illustrated example, the two large-diameter faces 11d are recession/projection formed between the three annular grooves 11c.

The corner part 11e of the large-diameter cylindrical face 11b which is the front end edge of the nipple 11 is R-chamfered as chamfering.

Coming-off prevention means 13 for regulating the position of a tightening member 30 which will be described later, unable to move in the axial direction is provided on the outer peripheral face 11a of the nipple 11. In the case of the illustrated example, a flange-shaped locking part is protruded/formed as the coming-off prevention means 13 of the tightening member 30 which will be described later, between the nipple 11 of the joint main body 10 and the connecting part 12.

Moreover, the connecting part 12 of the joint main body 10 is a ferule (ferule) as illustrated in FIGS. 3(a) to 3(d) and is detachably connected to another ferule (not shown) formed on a hose connection port of another device by using a connecting tool (not shown) called a clamp or a clamp band.

Furthermore, though not shown as other examples, the disposition locations, disposition numbers or respective sizes of the plurality of annular grooves 11c and the plurality of large-diameter faces 11d can be changed to those other than the illustrated example, or the corner part 11e of the large-diameter cylindrical face 11*b* which is the front end edge of the nipple 11 can be C-chamfered.

As a variation of the connecting part 12 of the joint main body 10, a screw part or a tool engaging part can be formed instead of the ferule. The screw part which is used as the connecting part 12 of the joint main body 10 is formed so as to be screwed with a screw part (not shown) on a hose connection port of another device, and the screw parts are screwed with each other and detachably connected by a rotation operation of the tool engaging part with which a tool (not shown) such as a spanner, a wrench or the like, for example, is engaged.

The elastic sleeve 20 is, as illustrated in FIGS. 2(*a*) and 2(*b*), cylindrically formed of a soft synthetic resin containing a fluorine resin such as polyvinylidene fluoride (PVDF), for example, or an elastically deformable hard material such as rubber which is excellent in heat resistance and harder than a constituent material of the flexible hose B and elastically deformable in a radial direction by expanding/contracting deformation at least in a circumferential direction. Particularly, the elastic sleeve 20 is preferably a cylindrical body made of a hard material which is harder than the soft material containing silicone rubber and is elastically deformable in the circumferential direction and the radial direction.

The elastic sleeve 20 is, as illustrated in FIGS. 1(*a*) and 1(*b*), assembled so as to face the outside of the outer peripheral face 11*a* of the nipple 11 in the radial direction with the insertion space S of the flexible hose B by clamping both of them.

That is, in a set state in FIGS. 1(*a*) and 1(*b*) where the elastic sleeve 20 is assembled to the flexible hose B inserted into the nipple 11, the sleeve inner face 20*a* which is an inner peripheral face of the elastic sleeve 20 faces the outer surface B2 of the flexible hose B (connecting end part Ba) in the radial direction, and a sleeve outer face 20*b* which is an outer peripheral face of the elastic sleeve 20 faces the tightening member 30 which will be described later in the radial direction.

The elastic sleeve 20 is radially contracting-deformed and radially expanding-deformed elastically with pressing by the tightening member 30 which will be described later and is set such that an inner diameter at the radial contracting deformation is smaller than the outer diameter of the flexible hose B (connecting end part Ba), and the inner diameter at the radial expanding deformation is substantially the same or slightly larger than the outer diameter of the flexible hose B (connecting end part Ba).

The elastic sleeve 20 has a plurality of slits 21 which are notched/formed and a plurality of band-plate parts 22 which are formed among the plurality of slits 21. The elastic sleeve 20 is made elastically deformable in the radial direction smoothly of the elastic sleeve 20 by the plurality of slits 21 and the plurality of band-plate parts 22.

The plurality of slits 21 are disposed at predetermined intervals in the circumferential direction of the elastic sleeve 20 so that each extends in the axial direction, and the plurality of band-plate parts 22 formed among the slits 21 are disposed so as to be substantially parallel with each other.

The plurality of slits 21 and the plurality of band-plate parts 22 are configured such that, by the pressing of the tightening member 30 which will be described later, the plurality of band-plate parts 22 are gradually brought closer to each other in the circumferential direction, and intervals between the plurality of slits 21 are narrowed in the circumferential direction, respectively, so that the elastic sleeve 20 is radially contracting-deformed in the entirety. Moreover, it is also configured such that the pressing by the tightening member 30 is freed, the plurality of band-plate parts 22 are gradually separated from each other in the circumferential direction, and the intervals between the plurality of slits 21 are expanded in the circumferential direction, respectively, so that the elastic sleeve 20 is radially expanding-deformed in the entirety.

Moreover, inner faces of the plurality of band-plate parts 22 which are inner peripheral faces (sleeve inner faces 20*a*) of the elastic sleeve 20 have cylindrical inner faces 23 facing the outer surface B2 of the flexible hose B in the radial direction. The sleeve inner face 20*a* preferably has an annular rib 24 and a projecting part 25 for pressing in addition to the cylindrical inner face 23.

The cylindrical inner faces 23 are formed in a non-inclined smooth state having the same inner diameter over a region with a predetermined length in the axial direction facing the large-diameter cylindrical face 11*b* of the nipple 11 in the radial direction in the sleeve inner face 20*a*. The cylindrical inner face 23 is preferably formed by partially protruding toward the outer surface B2 of the flexible hose B in the radial direction.

Moreover, the corner part 23*a* which is the front end edge of the cylindrical inner face 23 is preferably chamfered. The chamfering includes C-chamfering in which the corner part 23*a* is diagonally chipped off and R-chamfering in which the corner part 23*a* is worked to have a shape with an arc section.

The annular ribs 24 are formed in plural at predetermined intervals, respectively, so as to face the annular groove 11*c* in the radial direction with the flexible hose B clamped in the sleeve inner face 20*a*.

Moreover, a protrusion amount of the cylindrical inner face 23 protruding from the sleeve inner face 20*a* toward the outer surface B2 of the flexible hose B in the radial direction is preferably formed smaller than the protrusion amount of the annular rib 24.

The projecting part 25 for pressing is, as illustrated in FIG. 1(*b*), formed annularly so as to protrude at a position separated by a predetermined length in the axial direction from the large-diameter cylindrical face 11*b* of the nipple 11 in the front end edge of the sleeve inner face 20*a*. It is configured such that, by pressing the outer surface B2 of the flexible hose B with the projecting part 25 for pressing toward the inner side in the radial direction, the inner surface B1 of the flexible hose B pressed to the inside in the radial direction is continued to the tapered part 11*g* of the inner peripheral face 11*f* of the nipple 11.

In the case illustrated in FIGS. 1 to 3 as a specific example of the elastic sleeve 20, it is formed in a staggered manner such that the plurality of slits 21 extending linearly in the axial direction and dividing into the plurality of band-plate parts 22 and the plurality of connecting parts 26 allowing the plurality of band-plate parts 22 to continue to each other in the circumferential direction are disposed alternately in the circumferential direction on the both sides in the axial direction of the elastic sleeve 20.

As illustrated in FIGS. 2(*a*) and 2(*b*), by making a width dimension in the circumferential direction smaller in the plurality of band-plate parts 22, a large number of the slits 21 and the band-plate parts 22 are disposed in the circumferential direction.

On the sleeve inner face 20*a* of the elastic sleeve 20, the cylindrical inner face 23 is protruded/formed on the front end side at an intermediate position in the axial direction, and the two annular ribs 24 are protruded/formed at the intermediate positions in the axial direction.

Moreover, though not shown as other examples, the plurality of slits 21, the plurality of band-plate parts 22, and the plurality of connecting parts 26 can be disposed in a manner other than the staggered one, the plurality of slits 21 can be notched/formed so as to extend non-linearly such as a curve other than linearly, or the disposition location, the disposition number or the size and shape of each of the cylindrical inner face 23 and the plurality of annular ribs 24 can be changed to those other than the illustrated example.

Moreover, the corner part 23*a* which is the front end edge of the cylindrical inner face 23 is C-chamfered as the chamfering working.

Though not shown as other examples, the corner part 23*a* which is the front end edge of the cylindrical inner face 23 can be also R-chamfered.

Moreover, as a specific example of the entire shape of the elastic sleeve 20, it is formed having a shape symmetrical in the axial direction. As a result, a similar function can be obtained even if the nipple 11 is recombined in either the forward or reverse direction in the axial direction.

In addition, in order to facilitate molding of the cylindrical inner face 23 and the plurality of annular ribs 24, as illustrated in FIGS. 2(*a*) and 2(*b*), the elastic sleeve 20 is divided at the predetermined intervals in the circumferential direction, and the plurality of band-shaped bodies 20' and 20" are formed. The plurality of band-shaped bodies 20' and 20" are molded capable of expanding/contracting deformation in the circumferential direction of the elastic sleeve 20, and integrally connect end parts of the plurality of band-shaped bodies 20' and 20" to each other.

In the illustrated example, the elastic sleeve 20 is divided into halves in the circumferential direction, the plurality of band-shaped bodies 20' and 20" are ejection-molded into the same shape, and the direction of either one of the plurality of band-shaped bodies 20' and 20" is changed with respect to the other (reversed) and connected by fitting parts 27 provided on both ends of the plurality of band-shaped bodies 20' and 20".

Though not shown as other examples, it is possible to change the entire shape of the elastic sleeve 20 to an asymmetric shape to the axial direction, to integrally mold the elastic sleeve 20 substantially cylindrically, to change the number of divisions of the elastic sleeve 20 in the circumferential direction, or to change the shape of the fitting part 27 into a shape other than that in the illustrated example.

The tightening member 30 is, as illustrated in FIGS. 3(*a*) to 3(*d*), formed of a rigid material such as hard-to-rust metal including stainless and brass or a hard synthetic resin into a cylindrical shape or a shape similar to a cylinder having an inner diameter slightly larger than the outer diameter of the elastic sleeve 20 and is compressing means for radial contracting deformation of the elastic sleeve 20 by an artificial operation.

The tightening member 30 has a pressing part 31 facing the outer peripheral face of the elastic sleeve 20 (sleeve outer face 20*b*) in the radial direction and is configured so that the flexible hose B (connecting end part Ba) is radially contracting-deformed by pressing the sleeve outer face 20*b* in the radial direction by the pressing part 31 along with the artificial operation.

Moreover, it is preferable that an engaging part 32 engaged with the elastic sleeve 20 in the axial direction is provided on the inner periphery facing the sleeve outer face 20*b* in the radial direction in the tightening member 30, and it is preferable that the engaging part 32 positions the elastic sleeve 20 in the axial direction, unable to move.

In the case illustrated in FIGS. 1 to 3 as a specific example of the tightening member 30, compression means of such a division type is used that divided holders 30*a* and 30*b* which are divided into plural are moved to approach each other in the radial direction by a fastening component 30*c* such as a bolt so that the elastic sleeve 20 is pressed in the radial direction and is radially contracting-deformed.

When explained in more detail, as illustrated in FIGS. 3(*a*) to 3(*d*), the compression means of the division type includes the plurality of divided holders 30*a* and 30*b* divided in the radial direction and the fastening component 30*c* which causes the plurality of divided holders 30*a* and 30*b* to move to approach in the radial direction. The movement to approach of the plurality of divided holders 30*a* and 30*b* by the fastening component 30*c* causes the elastic sleeve 20 to be radially contracting-deformed.

In the case of the illustrated example, the plurality of divided holders 30*a* and 30*b* are formed into symmetrical shapes by dividing a cylindrical body into halves in the radial direction, and it is configured such that, by inserting and rotating/operating the fastening component 30*c* made of a screw component of a bolt or the like over peripheral end part 30*d* of each of the divided holders 30*a* and 30*b*, the divided holders 30*a* and 30*b* are moved to approach each other in the radial direction.

Moreover, in the case of the illustrated example, a stopper part 30*e* is provided so as to face the sleeve outer face 20*b* of the elastic sleeve 20 in the radial direction over the peripheral end parts 30*d* of the plurality of divided holders 30*a* and 30*b*. The stopper part 30*e* has a guide face 30*f* which is brought into contact in the radial direction with a material excess portion (not shown) of the elastic sleeve 20 which was radially contracting-deformed with the movement to approach of the plurality of divided holders 30*a* and 30*b* by the fastening component 30*c*. As a result, even if the material excess portion of the sleeve outer face 20*b* of the elastic sleeve 20 is to swell toward a space between the peripheral end parts 30*d* of the plurality of divided holders 30*a* and 30*b* adjacent to each other in the circumferential direction along with the radial contracting deformation of the elastic sleeve 20 by the movement to approach of the plurality of divided holders 30*a* and 30*b*, the guide face 30*f* of the stopper part 30*e* is brought into contact in the radial direction from the outside of the material excess portion of the sleeve outer face 20*b* so that the swelling of the material excess portion of the sleeve outer face 20*b* is suppressed.

Thus, the material excess portion of the sleeve outer face 20*b* does not enter the space between the peripheral end parts 30*d* of the plurality of divided holders 30*a* and 30*b* but is guided to the circumferential direction and prevents biting and enables tightening (complete tightening) of the plurality of divided holders 30*a* and 30*b* by the fastening component 30*c*.

Moreover, though not shown as other examples, such a change can be made that the cylindrical body is divided into three parts, four parts or more as the plurality of divided holders 30*a* and 30*b*, and each is moved to approach in a plurality of radial directions by the fastening component 30*c*.

According to the hose joint A according to the embodiment of the present invention as above, in a tightened state illustrated in FIG. 1(*b*) where the elastic sleeve 20 is radially contracting-deformed by the tightening member 30, the flexible hose B (connecting end part Ba) is clamped between the outer peripheral face 11a of the nipple 11 and the sleeve inner face 20a of the elastic sleeve 20 in the radial direction.

As a result, the flexible hose B (connecting end part Ba) is clamped by the nipple 11, unable to come off in the axial direction. Particularly between the large-diameter cylindrical face 11b of the nipple 11 and the cylindrical inner face 23 of the elastic sleeve 20, the flexible hose B (a part of the connecting end part Ba) is compression-deformed in the radial direction so as to be a clamped part Bb by clamping of the both.

In this tightened state, when the flexible hose B (a part excluding the connecting end part Ba) is bent in the radial direction with respect to the nipple 11 and the elastic sleeve 20 as indicated by a two-dot chain line in FIG. 1(b) by use of the flexible hose B or the like, a non-clamped part Bc adjacent to the clamped part Bb is partially flexion-deformed in the radial direction and is also expanding/contracting-deformed in the axial direction.

Thus, on a boundary part between the clamped part Bb and the non-clamped part Bc, a load with the flexion deformation or expanding/contracting deformation is applied in a concentrated manner, and a stress (pressure) is accumulated. In such a situation, when the flexible hose B is made of a soft material such as silicone rubber or the like, a slight cut would easily lead to fracture.

Even in such a situation, by pressure-welding the inner surface B1 of the clamped part Bb to the large-diameter cylindrical face 11b smoothly, the material constituting the clamped part Bb can be moved smoothly toward the non-clamped part Bc along the large-diameter cylindrical face 11b along with the flexion deformity and the expanding/contracting deformation of the flexible hose B (the part excluding the connecting end part Ba), and the load is distributed.

Thus, if a movement amount of the constituent material from the clamped part Bb to the non-clamped part Bc increases, it realizes stress-free, and a cut is not generated on the boundary part between the clamped part Bb and the non-clamped part Bc.

Therefore, even in the case of the flexible hose B made of a soft material such as silicone rubber, the flexible hose B is not cut with the flexion of the flexible hose B, and the flexible hose B can be prevented from coming-off for a long time.

As a result, as compared with a conventional type in which a hose is clamped in the radial direction between the barbed-shaped protrusions of the nipple and the peripheral protrusions of the sleeve and tightened, the function of preventing fracture caused by the cut in the flexible hose B and the function of preventing coming-off of the flexible hose B can be both provided at the same time, stable hose connection of the flexible hose B is maintained for a long time, and occurrence of an accident such as fluid leakage can be prevented, which is excellent in safety and economy.

Particularly, it is preferable to form the cylindrical inner face 23 in the sleeve inner face 20a partially protruding toward the outer surface B2 of the flexible hose B in the radial direction.

In this case, in the tightened state illustrated in FIG. 1(b), the cylindrical inner face 23 partially protruding from the sleeve inner face 20a bites into the outer surface B2 of the flexible hose B, whereby the inner surface B1 of the clamped part Bb in the flexible hose B pressed by the cylindrical inner face 23 is brought into close contact with the large-diameter cylindrical face 11b of the nipple 11.

Therefore, coming-off strength and airtightness of the flexible hose B to the large-diameter cylindrical face 11b of the nipple 11 can be improved.

As a result, the coming-off prevention function of the flexible hose B is reinforced, stability of the hose connection can be further maintained for a long time, and occurrence of an accident such as fluid leakage can be prevented, whereby safety can be further improved.

Moreover, it is preferable that the outer peripheral face 11a of the nipple 11 has the annular groove 11c provided adjacent to the large-diameter cylindrical face 11b in the axial direction, and the sleeve inner face 20a has the annular rib 24 provided by facing the annular groove 11c in the radial direction with the flexible hose B clamped.

In this case, in the tightened state illustrated in FIG. 1(b), the annular rib 24 of the sleeve inner face 20a bites into the outer surface B2 of the flexible hose B, whereby the inner surface B1 of the clamped part Bb in the flexible hose B pressed by the annular rib 24 is fitted into the annular groove 11c of the nipple 11.

Thus, the inner surface B1 of the flexible hose B is recession/projection fitted with the large-diameter cylindrical face 11b and the annular groove 11c in the axial direction, respectively, and the flexible hose B is positioned in the axial direction.

Therefore, the flexible hose B can be pressed in the axial direction, unable to come off.

As a result, the coming-off prevention function of the flexible hose B is further reinforced, further stable hose connection can be maintained for a long time, and prevention of occurrence of an accident such as fluid leakage and further improvement of safety can be promoted.

Moreover, the protrusion amount of the cylindrical inner face 23 protruding from the sleeve inner face 20a toward the outer surface B2 of the flexible hose B in the radial direction is preferably formed smaller than the protrusion amount of the annular rib 24.

In this case, in the tightened state illustrated in FIG. 1(b), the biting amount of the cylindrical inner face 23 to the outer surface B2 of the flexible hose B is smaller than the biting amount of the annular rib 24 to the outer surface B2 of the flexible hose B.

Thus, even if the flexible hose B (the part excluding the connecting end part Ba) is bent in the radial direction with respect to the nipple 11 and the elastic sleeve 20 as indicated by the two-dot chain line in FIG. 1(b) by use of the flexible hose B or the like, a cut is hardly generated in the outer surface B2 of the flexible hose B by the biting of the cylindrical inner face 23 protruding from the sleeve inner face 20a.

Therefore, a cut accompanying the bending of the flexible hose B can be reliably prevented.

As a result, the prevention function of fracture caused by the cut in the flexible hose B is reinforced, and stability of the hose connection for a long time, prevention of occurrence of an accident such as fluid leakage as well as safety can be both improved.

In the embodiment described above, the division type compression means was used as the specific example of the tightening member 30, but it is not limiting, and the division type compression means may be changed to other tightening means such as use of a cap nut described in Japanese Patent Application Publication No. 2001-193876.

REFERENCE SIGNS LIST

A Hose joint
11 Nipple
11a Outer peripheral face
11b Large-diameter cylindrical face
11c Annular groove
20 Elastic sleeve
20a Sleeve inner face
23 Cylindrical inner face
24 Annular rib
30 Tightening member
31 Pressing part
B Flexible hose
B1 Inner surface
B2 Outer surface
S Insertion space of flexible hose

The invention claimed is:

1. A hose joint comprising:
a cylindrical nipple provided along an insertion space of a flexible hose;
an elastic sleeve which is provided so as to clamp the insertion space of the flexible hose between an outer peripheral face of the nipple and the elastic sleeve in a radial direction and is deformable in the radial direction; and
a tightening member provided outside the elastic sleeve and having a pressing part that presses the elastic sleeve toward the nipple, wherein
the nipple has a large-diameter cylindrical face which is smooth in an axial direction and faces and pressure-welds to an inner surface of the flexible hose in the radial direction on an axial direction front end of the outer peripheral face,
the elastic sleeve has a cylindrical inner face which is smooth in the axial direction and extends in parallel with the axial direction and pressure-welds to an outer surface of the flexible hose on a sleeve inner face facing the large-diameter cylindrical face of the nipple in the radial direction across the flexible hose clamped,
the outer peripheral face of the nipple has an annular groove provided adjacent to the large-diameter cylindrical face in the axial direction, and a bottom of the annular groove has a constant diameter in an axial direction,
the sleeve inner face has an annular rib provided facing the annular groove in the radial direction across the flexible hose clamped and a top of the annular rib has a constant diameter in the axial direction, and
on the sleeve inner face, the cylindrical inner face is formed partially protruding toward the outer surface of the flexible hose in the radial direction.

2. The hose joint according to claim 1, wherein
a protrusion amount of the cylindrical inner face protruding from the sleeve inner face toward the outer surface of the flexible hose in the radial direction is formed smaller than a protrusion amount of the annular rib.

3. A hose joint comprising:
a cylindrical nipple provided along an insertion space of a flexible hose;
an elastic sleeve which is provided so as to clamp the insertion space of the flexible hose between an outer peripheral face of the nipple and the elastic sleeve in a radial direction and is deformable in the radial direction; and
a tightening member provided outside the elastic sleeve and having a pressing part that presses the elastic sleeve toward the nipple, wherein
the nipple has a large-diameter cylindrical face which is smooth in an axial direction and faces and pressure-welds to an inner surface of the flexible hose in the radial direction on an axial direction front end of the outer peripheral face,
the elastic sleeve has a cylindrical inner face which is smooth in the axial direction and extends in parallel with the axial direction and pressure-welds to an outer surface of the flexible hose on a sleeve inner face facing the large-diameter cylindrical face of the nipple in the radial direction across the flexible hose clamped,
the outer peripheral face of the nipple has an annular groove provided adjacent to the large-diameter cylindrical face in the axial direction, and a bottom of the annular groove has a constant diameter in an axial direction,
on the outer peripheral face of the nipple, at least one additional annular groove is provided closer toward a base end side of the hose joint than the annular groove, and
the sleeve inner face has an annular rib provided facing the annular groove, which is provided adjacent to the large-diameter cylindrical face in the axial direction, in the radial direction across the flexible hose clamped and a top of the annular rib has a constant diameter in the axial direction.

4. The hose joint according to claim 3, wherein
on the sleeve inner face, the cylindrical inner face is formed partially protruding toward the outer surface of the flexible hose in the radial direction.

5. The hose joint according to claim 3, wherein
a protrusion amount of the cylindrical inner face protruding from the sleeve inner face toward the outer surface of the flexible hose in the radial direction is formed smaller than a protrusion amount of the annular rib.

* * * * *